United States Patent Office 2,898,226
Patented Aug. 4, 1959

2,898,226

IMAGE DISPLAY

Lyle W. Evans, Thaddeus V. Rychlewski, and Robert F. Wilson, Seneca Falls, N.Y., assignors, by mesne assignments, to Sylvania Electric Products Inc., Wilmington, Del., a corporation of Delaware No Drawing. Application December 31, 1957
Serial No. 706,278

15 Claims. (Cl. 117—33.5)

This invention relates to image display screens and more particularly to luminescent screens which are formed by vaporization techniques.

Luminescent screens for devices such as cathode ray tubes may be formed by vaporizing phosphor materials upon the glass viewing panel of the tube. Generally, in the vaporization process, it has been found necessary to heat the phosphor coated panel to a temperature of approximately 1000° C. in order to produce a screen having acceptable luminescence. This temperature is much too high for use with conventional cathode ray tube manufacturing techniques and it requires the adoption of expensive high temperature "hard glass" for the panel material. In order to reduce the processing temperatures of some types of evaporated luminescent screens, it has been proposed that a corrosive or toxic atmosphere containing a halogen and hydrogen sulfide be used either in the initial phosphor vaporization process or in the subsequent firing operation. However, the utilization of a corrosive or toxic atmosphere is expensive and difficult to handle in production and it tends to decrease the screen brightness.

Accordingly, an object of the invention is to reduce the aforementioned disadvantages and to improve the fabrication of evaporated luminescent screens.

A further object is to produce an evaporated luminescent screen at a temperature which allows the use of "soft glass" as the substrate upon which the luminescent material is deposited.

Another object is to alleviate the need for a corrosive or toxic atmosphere in the production of vaporized luminescent screens.

A still further object is to provide an improved image display screen.

The foregoing objects are achieved in one aspect of the invention by the provision of a process wherein a phosphor is vaporized with or without a flux upon a glass substrate under vacuum, followed by a vapor coating of an activator for the phosphor also under vacuum. The resulting superposed layers are subsequently fired in air or in a vacuum at a temperature substantially within the range of "soft glass" to provide an ion, photon and electron responsive luminescent screen having a high level of brightness.

The luminescent materials used in the process may comprise ion, photon or electron responsive phosphors such as the interstitial of I-center phosphors which include the sulfur-selenium dominated group comprising sulfides and selenides of cadmium and zinc and combinations of cadmium and zinc sulfides and selenides. These phosphors may be activated with metals such as silver, copper, manganese, gold and zinc and/or their salts.

In accordance with one aspect of the invention, a luminescent screen may be formed by depositing an I-center phosphor such as zinc sulfide, either activated or unactivated, into a suitable holder like a carbon boat. Subsequently, the boat is placed within an enclosure and spaced from the glass panel or substrate which is to be coated. The enclosure is subsequently evacuated, and the phosphor material is vaporized by the energization of an electrical heater wire mounted within or adjacent to the boat to coat the panel. The vaporization temperature in the immediate vicinity of the electrical heater has been found to be approximately 1100° C.

For most of the I-center phosphors such as zinc sulfide, it has been found beneficial to evaporate a flux along with the phosphor. This flux may comprise salts such as chlorides, bromides, iodides, sulfates etc. of such metals as lithium, barium, sodium and potassium. The flux is believed to promote low temperature crystallization of the phosphor.

Within the same enclosure is mounted another boat which has deposited therein an activator metal or metal salt such as silver or silver chloride. The boat is also spaced from the panel or substrate and, under vacuum, the metal or activator salt is vaporized over the previously deposited phosphor film. If desired, two separate enclosures, one for the phosphor and one for the activator may be used.

After the coating operation, the glass panel or substrate is removed from the enclosure and placed in a furnace for firing in a vacuum or in air at approximately 550° C. for sufficient time for the silver to diffuse into the phosphor layer, which may be approximately one and a half hours. The luminescent screen so produced is photon, ion and electron responsive to provide a blue luminescence with a high level of brightness. This screen comprises a dark matte appearing layer composed of an excess of silver which has not diffused into the phosphor and an activator compound such as silver sulfide disposed over the substantially transparent silver activated zinc sulfide phosphor film. Due to this dark matte backing for the luminescent film, contrast of the reproduced image is improved.

It has been found that an I-center phosphor provides a higher level of brightness than the substitutional or S-center phosphors when utilized in the process described above. An I-center phosphor is one in which the activator atoms may lodge in interstitial sites between the regular host-crystal phosphor atoms, thereby forming the I-centers. The activator is believed to promote luminescence of the phosphor after firing by originating or intensifying a band emission spectrum of the host phosphor crystal or by introducing positive hole trapping states in the crystalline structure.

It has been found that the luminescence of interstitial phosphors may be increased appreciably if they are activated in the manner described above with the application of an excessive amount of activator over what is generally needed for activation. For instance, in the conventional production of silver activated zinc sulfide, the silver generally comprises .01 percent by weight of the sulfide. When practicing the invention, the weight of silver to sulfide may be approximately 10 percent for optimum results. A convenient method of expressing the amount of activator which is vapor deposited behind the substantially transparent phosphor film is by percentages of light transmission through the screen. It has been found that a silver activator coating having a thickness which allows from approximately 2 percent to 30 percent of light transmission through the silver coated zinc sulfide screen before firing provides acceptable luminescence after firing at approximately 450° C. The brightness level of the screen tends to depend upon the firing temperature and activator thickness in an inverse relationship. That is, the silver coating thickness needed to start fluorescence decreases with increased firing temperature.

The optimum firing time and temperature depend upon the kind and amount of materials used. It has been found that the time varies from several minutes to two hours while the optimum temperature may be from 400° to 600° C. This temperature span is substantially within the "soft glass" and conventional cathode ray tube processing ranges so that the method described herein is well adapted to the utilization of economical production materials and techniques.

If it is desired to produce a substantially transparent luminescent display screen having a very high level of brightness rather than a screen with a dark matte backing having a somewhat lower brightness level but excellent contrast as described above, most of the excess silver and dark silver sulfide layer may be removed by the application of an alkali like potassium hydroxide, potassium cyanide, thiosulfates, etc. Subsequently, the screen may be washed with water and dried to provide a substantially non-granular silver activated zinc sulfide phosphor. Due to the even texture and smooth surface of the phosphor film, it may provide a base for the application, if desired, of an electron permeable metallic light reflective film or an indexing pattern for purposes well understood in the art.

Although several embodiments of the invention have been shown and described, it will be apparent to those skilled in the art, that various changes and modifications may be made therein without departing from the scope of the invention as defined by the appended claims.

What is claimed is:

1. A process of forming a luminescent screen upon a substrate comprising the steps of vapor depositing a film of phosphor upon said substrate, vapor depositing a coating of a phosphor activator over the phosphor film, and firing said screen to promote activation of the phosphor.

2. A process of forming a luminescent screen upon a substrate comprising the steps of vapor depositing a film of phosphor upon said substrate, vapor depositing a coating of a phosphor activator over the phosphor film, and firing said screen below 600° C. to promote activation of the phosphor.

3. A process of forming a luminescent screen upon a substrate comprising the steps of vapor depositing a film of an activated phosphor upon said substrate, vapor depositing a coating of a phosphor activator over the phosphor film, and firing said screen to promote activation of the phosphor.

4. A process of forming a luminescent screen upon a substrate comprising the steps of vapor depositing a film of an interstitial type phosphor upon said substrate, vapor depositing a coating of a phosphor activator over the phosphor film, and firing said screen to promote activation of the phosphor.

5. A process of forming a luminescent screen upon a substrate comprising the steps of heating a phosphor to vapor deposit a film of said phosphor upon said substrate, heating a salt of a phosphor activator metal to vapor deposit a coating of the activator over the phosphor film, and firing said screen to promote activation of said phosphor.

6. A process of forming a luminescent screen upon a substrate comprising the steps of heating a luminescent material selected from the group consisting of sulfide and selenide phosphors to vapor deposit a film of the phosphor upon said substrate, heating a phosphor activator to vapor deposit a coating of said activator over said phosphor film, and firing said screen to promote activation of the phosphor.

7. A process of forming a luminescent screen upon a substrate comprising the steps of heating a luminescent material selected from the group consisting of sulfide and selenide phosphors to vapor deposit a film of the phosphor upon said substrate, heating a phosphor activator metal selected from the group consisting of silver, copper, manganese, gold and zinc to vapor deposit a coating of said activator metal over said phosphor film, and firing said screen to promote activation of the phosphor.

8. A process of forming a luminescent screen upon a substrate comprising the steps of heating a luminescent material selected from the group consisting of sulfide and selenide phosphors to vapor deposit a film of the phosphor upon said substrate, heating a phosphor activator material selected from the group consisting of salts of silver, copper, manganese, gold and zinc to vapor deposit a coating of said activator material over said phosphor film, and firing said screen to promote activation of the phosphor.

9. A process of forming a luminescent screen upon a substrate comprising the steps of heating a luminescent material selected from the group consisting of sulfide and selenide phosphors to vapor deposit a film of the phosphor upon said substrate, heating a phosphor activator material to vapor deposit a coating of said activator material over said phosphor film, firing said screen to cause diffusion of a quantity of the activator material into said phosphor film, and substantially removing the remainder of said activator material by dissolving with a solvent.

10. A process of forming a luminescent screen upon a substrate comprising the steps of heating a luminescent material selected from the group consisting of sulfide and selenide phosphors to vapor deposit a film of the phosphor upon said substrate, heating a phosphor activator material selected from the group consisting of silver, copper, manganese, gold and zinc to vapor deposit a coating of said activator material over said phosphor film, firing said screen to cause diffusion of a quantity of the activator material into said phosphor film, and substantially removing the remainder of said activator material by dissolving with a solvent.

11. A process of forming a luminescent screen upon a substrate comprising the steps of heating a phosphor to vapor deposit a film of said phosphor upon said substrate, heating a phosphor activator material to vapor deposit a coating of said activator material over said phosphor film, firing said screen to cause diffusion of a quantity of the activator material into said phosphor film, and substantially removing the remainder of said activator material by dissolving with a solvent.

12. A screen for an image display device comprising a viewing panel, a smooth film of phosphor material disposed upon said panel, and a layer of an activator material for said phosphor covering said phosphor film.

13. A screen for an image display device comprising a viewing panel, a smooth film of an interstitial type phosphor material disposed upon said panel, and a layer of an activator material for said phosphor covering said phosphor film.

14. A screen for an image display device comprising a viewing panel, a smooth film of a sulfide phosphor disposed upon said panel, and a layer of an activator metal sulfide covering said phosphor film.

15. A screen for an image display device comprising a viewing panel, a smooth film of a selenide phosphor disposed upon said panel, and a layer of an activator metal selenide covering said phosphor film.

References Cited in the file of this patent

UNITED STATES PATENTS

| Number | Name | Date |
| --- | --- | --- |
| 2,600,579 | Ruedy et al. | June 17, 1952 |
| 2,672,451 | Wollentin et al. | Mar. 16, 1954 |
| 2,685,530 | Cusano et al. | Aug. 3, 1954 |
| 2,732,312 | Young | Jan. 24, 1956 |
| 2,732,313 | Cusano et al. | Jan. 24, 1956 |
| 2,789,062 | Cusano et al. | Apr. 16, 1957 |